UNITED STATES PATENT OFFICE.

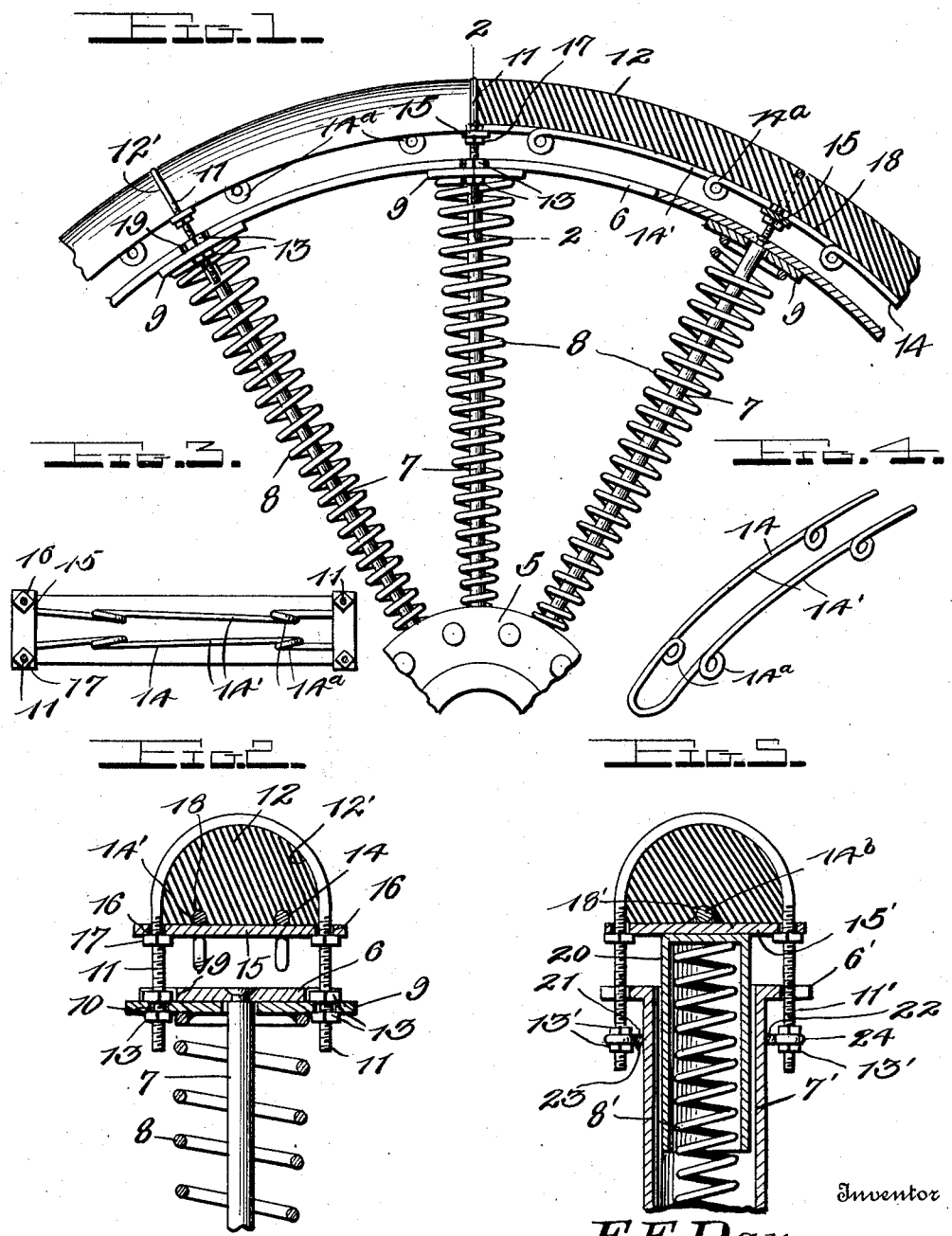

FRANK EDWARD DAY, OF EVERETT, MASSACHUSETTS.

RESILIENT WHEEL.

1,043,075.　　Specification of Letters Patent.　　Patented Nov. 5, 1912.

Application filed January 18, 1912. Serial No. 671,797.

*To all whom it may concern:*

Be it known that I, FRANK EDWARD DAY, a citizen of the United States, residing at Everett, in the county of Middlesex and State of Massachusetts, have invented certain new and useful Improvements in Resilient Wheels, of which the following is a specification, reference being had to the accompanying drawings.

This invention relates to resilient vehicle wheels and has for its primary object to provide a wheel of simple and efficient construction whereby shock or jar to the body of the vehicle in traveling over rough or uneven grade surfaces is eliminated.

Another object of the invention is to provide a vehicle wheel having a solid rubber tread, means arranged on the spokes of the wheel between the hub and the rim thereof to normally hold said tread yieldingly in concentric relation to the hub, and supplementary reinforcing and supporting means carried by said tread.

A further object of the invention resides in the provision of a wheel including a rim and hub and radial spokes connecting the same, springs arranged on said spokes having plates on their outer ends, and adjustable tread clamping means carried by said plates to normally retain the tread in yielding spaced relation to the rim of the wheel.

Still another object of the invention is to provide a device of the above character which is extremely durable in construction, and the various parts of which may be removed and replaced by others at a nominal expense.

With the above and other objects in view, the invention consists of the novel features of construction, combination and arrangement of parts hereinafter fully described and claimed, and illustrated in the accompanying drawings, in which—

Figure 1 is a side elevation partly in section of a portion of a vehicle wheel illustrating the preferred embodiment of the invention; Fig. 2 is a transverse section taken on the line 2—2 of Fig. 1; Fig. 3 is a fragmentary bottom plan view of the wheel tread; Fig. 4 is a detail perspective view of one of the supplementary spring members carried by the tread; and Fig. 5 is a section similar to Fig. 2 illustrating a slightly modified form of the invention.

Referring in detail to the drawings 5 designates the hub of a vehicle wheel and 6 the rim thereof. The hub and rim are connected by a plurality of radial spokes 7 and upon each of these spokes a spiral spring 8 is arranged, the inner ends of the springs being fixed to the spoke or hub of the wheel as desired. It will of course be understood that the coiled springs 8 are heavy or light as may be necessitated by the character of the vehicle and the weight of the load which is to be carried thereby.

Upon each of the wheel spokes 7, a plate 9 is loosely mounted, the outer ends of the springs 8 being rigidly secured to the inner surfaces of said plates. These coiled springs normally act to retain the plates 9 in close engagement with the inner face of the wheel rim 6, and said plates project beyond the opposite longitudinal edges of the wheel rim and are provided with openings 10 to receive the ends of the yoke rods 11. Between the parallel arms of these yoke rods the wheel tread 12 is arranged, and this tread may be of solid rubber or other desired material. The arms of the yoke rods are threaded to receive the nuts 13 which bear against the inner surfaces of the spring held plates 9. By adjusting these nuts upon the yoke rods, the wheel tread is held normally in concentric relation to the rim of the wheel. The intermediate transversely extending portions of the yoke rods are seated in transverse grooves 12′ formed in the tread surface, and by adjusting the nuts 13 said rods are drawn tightly upon the tread 12 and seated in the walls of the grooves therein. Thus the yoke members may be readily adjusted as the tread becomes worn down through continuous use. Transverse plates 15 are arranged beneath the tread 12 and are provided in their ends with openings 16 to loosely receive the arms of the yoke rods 11. Nuts 17 are threaded upon the yoke to engage said plates and move the same outwardly into engagement with the inner surface of the annular tread, thereby securely clamping said tread in the transverse curved portions of the yoke members.

The clamping plates 15 are connected by a series of supplementary spring members 14 which reinforce and strengthen the tread. These supplementary spring members are each formed from a length of resilient heavy wire which is bent upon itself to provide the parallel portions 14′ each having spaced coils 14ª formed therein. The intermediate portion of this resilient wire and the ends thereof are secured in any suitable manner to the adjacent clamping plates 15, and the parallel portions of said wire are seated in the spaced annular grooves or channels 18 in the inner surface of the tread 12. These supplementary spring members are more particularly designed for use in connection with wheels to be employed upon trucks or other heavy vehicles, and in connection with the coiled springs 8 on the spokes of the wheel effectually prevent undue compression of the wheel tread when the same is subjected to load pressure.

It will be noted that the longitudinal edges of the wheel rim 6 are provided with notches or recesses 19 to receive the parallel arms of the yoke rods 11 whereby relative longitudinal movement of said yoke rods upon the tread of the wheel is obviated.

In Fig. 5 of the drawing I have illustrated a slightly modified form of the device wherein the wheel spokes 7' are of tubular form to provide housings for the coiled springs 8'. In this form of the invention, the plate 9 is dispensed with and to the plate 15 a tubular socket member 20 is centrally secured and is telescopically disposed in the outer end of the tubular spoke 7'. The outer end of the coiled spring 8' is fixed to the outer closed end of this tubular socket member. This socket member is freely movable in the wheel spoke. A clamping yoke is arranged upon the tire and extends through the ends of the plate 15 in the manner previously described and is disposed through recesses in the rim plate 6' which is integrally formed upon the outer ends of the tubular spokes 7'. A retaining and guide member 21 is provided for this yoke and consists of an annular ring or band 22 movable upon the tubular spoke 7', said band having opposite laterally extending arms 23 provided with eyes 24 on their ends to receive the threaded ends of the clamping yoke 11'. Nuts 13' are threaded upon the ends of this clamping yoke to retain the same in the eyes 24. In this manner it will be readily seen that the clamping yoke is greatly strengthened and relative movement of the parallel arms thereof is effectually overcome. In this modified form of the invention which is designed for use upon light vehicles, a single reinforcing or strengthening wire 14b connects the tread clamping plates 15' and is seated in a central groove 18' in the inner face of the wheel tread. This reinforcing wire prevents abnormal bending or flexing of the wheel tread between the clamping plates 15 and materially prolongs the life of said tread.

From the foregoing it is thought that the construction and operation of my improved resilient wheel will be fully understood.

The invention is simple in construction, may be manufactured at small cost and is extremely strong and durable in practical use.

It will of course be understood that metallic treads may be employed in connection with the other parts of the invention, in which case, however, the supplementary spring members 14 are omitted. In motor driven vehicles wherein the solid rubber tread is preferably used, my improved adjusting and clamping means will effectually prevent any circumferential movement of the tread with relation to the wheel rim.

It will also be appreciated that other forms of wheel treads may be used in lieu of that illustrated in the drawing, said treads being easily and quickly removed from the wheel.

While I have shown and described the preferred construction and arrangement of the various parts, it will be understood that the invention is susceptible of considerable modification without departing from the essential feature or sacrificing any of the advantages thereof.

Having thus described the invention what is claimed is:—

1. The combination with a wheel including a hub and rim, of a flexible tread normally disposed in spaced concentric relation to the rim, a plurality of radially disposed springs between the hub and rim, clamping means arranged on the outer ends of said springs to connect the tread thereto, said means including transversely disposed longitudinally spaced plates arranged on the inner face of the tread, and yieldable reinforcing means extending longitudinally upon the tread and connecting the adjacent plates.

2. The combination with a wheel including a hub and annular rim, of a plurality of coiled springs radially arranged between the hub and rim, plates fixed upon the outer ends of said springs, transversely disposed yokes carried by said plates, a wheel tread embraced by said yokes, means for adjusting said yokes to engage the same with the tread, and clamping means arranged upon the yokes to engage the wheel tread and normally maintain the same in spaced relation to the wheel rim.

3. The combination with a wheel including a hub and annular rim and spokes connecting said hub and rim, of coiled springs arranged upon said spokes and fixed thereto at their inner ends, plates secured upon the outer ends of the springs and yieldingly held in engagement with the rim, said plates having openings, transversely disposed yokes carried by said plates and having their arms loosely disposed through openings in said plates, means for adjusting said yokes upon the plates to engage the same with the tread of a wheel, and clamping plates mounted upon said yokes to rigidly clamp the tread in the yokes and maintain the same normally in spaced relation to the wheel rim.

4. The combination with a wheel including a hub and annular rim and radial spokes connecting said hub and rim, of coiled springs arranged upon said spokes and fixed thereto at their inner ends, plates secured upon the outer ends of said springs, said plates extending beyond the opposite edges of the rim and provided with openings, transversely disposed yoke rods having their ends loosely disposed through the openings in said plates, nuts threaded upon the ends of said rods to adjust the same with relation to the plates and engage the yoke rods upon the tread of a wheel, transversely disposed plates arranged upon the yoke rods, means adjustable upon the yoke rods to engage the clamping plates and rigidly secure the wheel tread in said yokes in spaced relation to the rim of the wheel, said wheel rim being provided with notches in its edges to receive the yoke rods and prevent their relative circumferential movement.

5. The combination with a wheel including a hub and annular rim, of a flexible tread disposed in spaced concentric relation to the rim, a plurality of coiled springs carried by the wheel to yieldingly support the tread in spaced relation to the rim, clamping means arranged on the outer ends of the springs to secure the tread thereto, said clamping means including plates transversely disposed upon the inner face of the tread, said tread having spaced annular grooves in its inner face, and resilient supplementary tread supporting members seated in said grooves and connected to the adjacent clamping plates.

6. The combination with a wheel including a hub and annular rim, of a flexible tread disposed in spaced concentric relation to said rim, a plurality of radially disposed springs to normally hold said tread in such position with relation to the wheel rim, clamping means on the outer ends of said springs to receive the tread and secure the same to said springs, said clamping means including transversely disposed plates arranged on the inner face of the tread, said tread having spaced annular grooves in its inner face, and a series of supplementary tread supporting members connecting the adjacent clamping plates and seated in the grooves of said tread, said members each consisting of a resilient wire bent upon itself to provide parallel portions, each of said parallel portions of the wire having spaced spring coils formed therein.

In testimony whereof I hereunto affix my signature in the presence of two witnesses.

FRANK EDWARD DAY.

Witnesses:
SUSIE JAMES,
MINNIE R. BLACK.

Copies of this patent may be obtained for five cents each, by addressing the "Commissioner of Patents, Washington, D. C."